(12) United States Patent
Sutton

(10) Patent No.: US 7,641,962 B2
(45) Date of Patent: Jan. 5, 2010

(54) FIBRE PRIVACY OR ROOM-DIVIDER PANEL

(75) Inventor: Tony Sutton, Palm Beach (AU)

(73) Assignee: Woven Image Pty Ltd., Warriewood NSW (AU)

( * ) Notice: Subject to any disclaimer, the term of this patent is extended or adjusted under 35 U.S.C. 154(b) by 330 days.

(21) Appl. No.: 11/462,883

(22) Filed: Aug. 7, 2006

(65) Prior Publication Data
US 2007/0033898 A1 Feb. 15, 2007

Related U.S. Application Data

(63) Continuation-in-part of application No. 10/987,905, filed on Nov. 12, 2004, now abandoned.

(51) Int. Cl.
B32B 27/14 (2006.01)
(52) U.S. Cl. .................. 428/198; 428/221; 442/402; 442/407; 156/148; 156/62.6
(58) Field of Classification Search .............. 428/198, 428/221; 442/402, 407; 156/148, 62.6, 62.2, 156/302, 309.6, 324
See application file for complete search history.

(56) References Cited

U.S. PATENT DOCUMENTS

| 4,258,093 | A | | 3/1981 | Benedyk | |
|---|---|---|---|---|---|
| 4,416,936 | A | * | 11/1983 | Erickson et al. | 442/405 |
| 4,612,228 | A | * | 9/1986 | Kato et al. | 428/151 |
| 4,818,586 | A | | 4/1989 | Smith et al. | |
| 5,380,582 | A | * | 1/1995 | Neely et al. | 428/220 |
| 5,554,831 | A | * | 9/1996 | Matsukawa et al. | 181/294 |
| 5,723,520 | A | * | 3/1998 | Akkapeddi et al. | 523/455 |
| 5,919,574 | A | * | 7/1999 | Hoagland | 428/532 |
| 5,928,973 | A | * | 7/1999 | Daniel et al. | 442/407 |
| 2007/0033898 | A1 | * | 2/2007 | Sutton | 52/782.1 |

FOREIGN PATENT DOCUMENTS

| DE | 19812925 | 9/1999 |
|---|---|---|
| EP | 0174813 | 3/1986 |
| JP | 03089959 | 3/2003 |
| WO | 02/047877 | 6/2002 |
| WO | 2004/048072 | 6/2004 |
| WO | 2004/059063 | 7/2004 |

OTHER PUBLICATIONS

"Vertiface Composition Acoustic Wall Covering"; Autex Wall Coverings Pamphlet; Autex Industries Ltd., Avondale, Auckland, New Zealand; Dec. 2001.
"Vertiface Composition:The Multipurpose Acoustic and Pinboard Walling System"; Autex Wall Coverings Pamphlet; Autex Industries Ltd., Avondale, Auckland, New Zealand; Dec. 2002.

* cited by examiner

Primary Examiner—N. Edwards
(74) Attorney, Agent, or Firm—Rankin, Hill & Clark LLP

(57) ABSTRACT

Rigid, non-woven fibre panels that are used as privacy screens, partitioning, room dividers or as workstation surrounds, for example, are described. The panels are strong and may be self supporting, have good acoustic properties, and preferably have a substantially smooth surface. They are made from a single, substantially homogeneous, layer of polyethylene terephthalate (PET) fibres, of which a substantial proportion may be of recycled PET. The panels are generally produced by mixing PET fibres into a web, which is then carded, cross-lapped, needle punched, calendered and thermally bonded, preferably using a heated roller.

21 Claims, 3 Drawing Sheets

FIBRE PRIVACY OR ROOM-DIVIDER PANEL

This application is a continuation in part of Ser. No. 10/987,905, filed Nov. 12, 2004, now abandoned.

TECHNICAL FIELD

The present invention relates to rigid, non-woven fibre panels that are useful in the building and interior design industry, particularly as wall panels, partitioning, room dividers or as workstation surrounds, for example. The panels are strong and rigid, have good acoustic properties, and can hold pins. They are made from a single layer of polyethylene terephthalate (PET) fibres, of which a substantial proportion may be of recycled PET.

BACKGROUND ART

Room dividers and partitioning are traditionally made as screens constructed from panels of MDF (Medium-Density Fibreboard), particleboard, fibreboard, pressed metal or similar materials. These panels are often covered with padding to allow for papers to be attached to their surface using pins, and to absorb noise in the work environment. The panels usually have an attractive surface covering, such as a layer of woven fabric that can be selected to match the room's décor. The panels are often held in a frame, and can be used to partition an open-space office, or to provide a partial surrounding for desks and workstations to provide some privacy and sound absorption.

These traditional panels are relatively expensive to manufacture, having to be constructed from a number of materials that must be combined and then fixed together. They are also not particularly satisfactory environmentally. Partitioning tends to have to be replaced frequently due to wear and tear or churn, which creates a problem in finding a good method for disposing of the old partitioning materials. The traditional materials are difficult to recycle, as considerable effort is required to separate the components, which often cannot be easily re-used. As a result this rarely happens in practice.

Partitioning is utilised to improve the aesthetics of office presentation, and to provide the workers with some privacy by partially enclosing their work area and absorbing noise. The partitioning can be fixed in place, or be temporary in nature as movable screens that can easily be rearranged. Partitioning and screens can be attached to, combined with, or positioned behind, furniture such as desk, tables, workstation carrels, for example. The screening may be full to provide a wall, or partial to provide only an open barrier. The screens can either fully or partially close off the area between the floor and the ceiling. Furthermore, such partitioning generally has useful acoustic properties to reduce noise in a workspace by providing a sound absorbing buffer between work areas. The partitioning is also often used as pin-boards. Any framework that supports the partition paneling may also be used to support shelves, or similar features.

Traditionally, perhaps the most commonly produced screens employ metal vertical supports configured to hold the edges of adjacent screen panels. A number of panels are arranged in this manner to provide partitioning that partly enclose a work area. Similarly, a line of the panels can be arranged at the front or rear of the work area or behind office furniture.

The panels can be of any suitable size. Partitioning may commonly be one to two meters wide and between one and three meters high. The partitioning is relatively expensive to produce. The panels are generally composed of metal or wood, typically in the form of MDF or other compressed boards or particleboards, where a pair of sheets of the material, such as wood, are cut to appropriate sizes and are arranged opposite each other. A metal frame, cardboard section or dowel or some other type of spacer is used to space the sheets a certain distance apart to define a void between the two wood sheets. The outer surfaces of each wood sheet is then normally painted, or covered with cloth material, or otherwise decorated.

Often, foam backing is used behind the cloth material covering to provide a softer surface and improve the acoustic properties. An edging, often of metal, may then be used to cover the edges of the wood sheets and the recess between them. When cloth is used to cover the surfaces of the wood sheets, the edging conceals the edges of the cloth. The cloth covering is held in place by tacking, stapling or gluing its edges within the recess. The cloth is select to have an attractive colour, for its environment.

These traditional screens are complex to produce because they require many steps, and they are even more complex to mass-produce where constant tolerances are required and considerable human effort is required to assemble the screens from their starting materials. Furthermore, some countries require that a significant portion of the screens is able to be recycled, which is also a desirable feature, anyway. For example, in Japan, 49% of the material comprising the screen needs to be recyclable. This therefore increases the cost of producing the screens, and for processing it once its lifetime is reached in order to recycle its components.

Furthermore the traditional partitioning materials are difficult to shape. The panels made from sheets of wood can only easily be made with a flat surface. It would be advantageous to have partitioning made from materials that can easily be shaped, to include folds, or indents, or the like features in the panels, to enhance their appearance, and to add to the strength of the panels, which normally is the result of shaping the panels in such a manner.

Furthermore there is often a problem arising from the off-gassing of volatile organic compounds from traditional partitioning panels due to the presence of glues and paint finishes. It would therefore be useful to enable partitions to be manufactured without the need for such volatile components to be used in their manufacture.

It would therefore be advantageous to have a partitioning material that is environmentally sound, which can easily be recycled, and which is relatively inexpensive to manufacture.

DISCLOSURE OF THE INVENTION

These and other advantages are met with the present invention, which in one broad form concerns, a substantially rigid, non-woven fibre, privacy or room divider panel (or screen) that has been carded, cross-lapped, needle punched, calendered and thermally-bonded, the panel composed essentially of a single, substantially homogeneous, layer of a polyethylene terephthalate (PET) fibre.

By "panel" is meant a screen, partition, acoustic panel, privacy screen, wall panel, roofing or especially ceiling, panel or tile, or room divider. Such panels are normally positioned within a room, or around or on a desk or item or furniture, to divide a large area into smaller areas, or to provide some privacy to people within the room, to reduce ambient noise, or to provide a decorative or aesthetic item, or to provide two or more of these functions.

Preferably, the panel has a relatively smooth surface. It is also preferred that the PET fibre is comprised substantially of a mixture of a two PET fibres, one having a lower melting point than the other. In this situation, ideally one of the PET fibres may have a melting point of about 110 C and the other a melting point of about 240 C. Also, the ratio of higher melting point PET to lower melting point PET may be in the range of 5:95 to 95:5 as % w/w. More preferably, the ratio of higher melting point PET to lower melting point PET may be approximately 60:40 as % w/w. It is also preferred in this situation that the panel is calendared and thermally bonded between rollers, and at least one of the rollers may be heated, thereby imparting an increase in temperature to the panel sufficient to soften or melt the one of the PET fibre having a lower melting point.

Another preferred aspect of the invention is that a substantial portion of the PET fibre may be of recycled PET. In this situation it is preferred that the panel may have a ratio of recycled to new PET fibre in the range of 5:95 to 95:5% w/w. More preferably, the panel may have a ratio of recycled to new PET fibre of about 40:60% w/w. It is also preferred that the panel has about 40% by weight of new PET fibres with a melting point of about 110 C and about 60% by weight of recycled PET fibres with a melting point of about 240 C.

The panel is ideally sufficiently rigid to be free standing without requiring supporting framework. As another preferred embodiment, the panel may have a thickness in the range of from 6 mm to 15 mm. More preferably it may have a thickness in the range of from 6 mm to 12 mm. Most preferably it may have a thickness of about 9 mm or of about 12 mm. Another preferred embodiment is a panel that has colouring agents within the PET fibres. Ideally, the panel should have good acoustic properties. It may also be shaped to include ribs or indentations. It is also preferred that the panel is adapted to be recycled once the panel is no longer in use.

BRIEF DESCRIPTION OF DRAWINGS

The invention is now discussed with reference to drawings, where.

BEST MODES FOR CARRYING OUT INVENTION

The panel of the invention is made from new, or recycled, or from a combination of new and recycled polyethylene terephthalate (PET) fibres. PET fibres are manufactured for a number of uses, such as in the production of fabrics.

New or virgin PET fibre is available in a variety of forms. For example it is available in at least two colours, white and black. Recycled PET fibre is generally available as off-white coloured fibres. The PET fibres can be used in their original colour, or may be produced with the additional inclusion of a dye or pigment, to create a staple fibre of another colour. It is also possible to mix two different colours of staple fibres together, during the manufacturing process for the panel, such as using both white and black fibres, to give a white/black combination that appears to be grey when viewed from a distance. If dyed, attractive and neutral colours, such as beige, green, grey or brown, or a natural ecru colour, are preferred, so as to form a coloured panel that will fit in with most office decor.

There are advantages in using a substantial proportion of recycled PET, both ecologically and economically. The disadvantage in using recycled PET is that this fibre often has inconsistent physical properties. But unexpectedly, it has been found that it can be used in the present invention to provide a good quality room divider panel material, despite this disadvantage.

These PET fibres are preferably either 2 or 6 denier in thickness and approximately 75 mm in staple length. The panel of the invention may be produced from a single type of fibre. Alternatively, the fibres may be a mixture of two types; one which has a lower melting point than the other. For example, one of the PET fibres to be included in the mixture has a melting point of about 110 C and the other of about 240 C.

Figure 1:
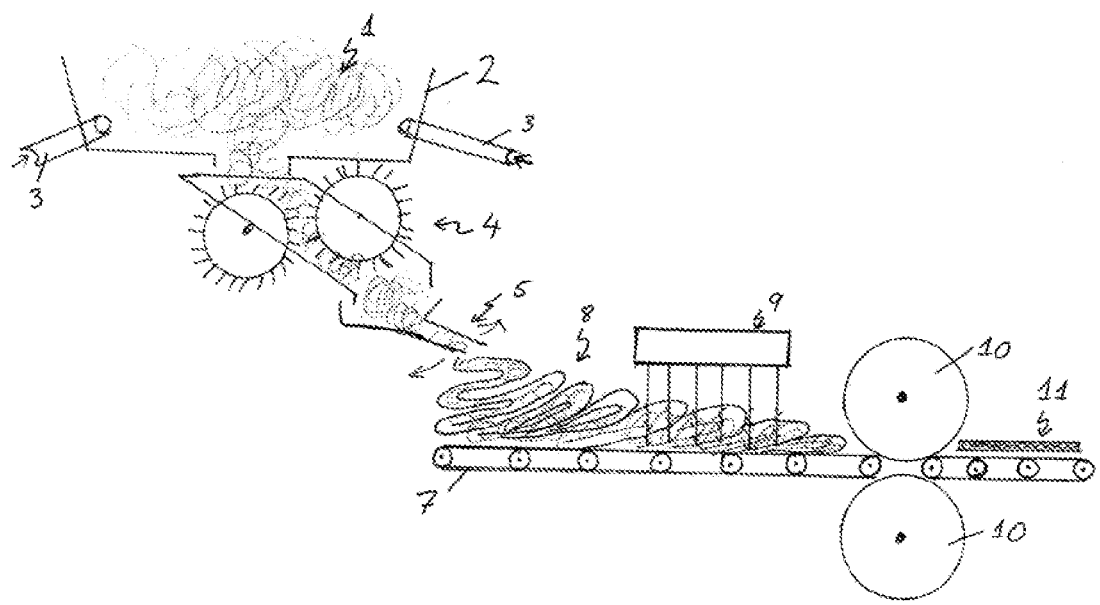
FIG. 1 shows a general schematic of the production process for the fibre panel of the invention.

A preferred method of manufacturing the panels of the invention is shown in FIG. 1, and involves loading the staple fibres (1) into a hopper (2) or a suitable blending apparatus and blending them together using air jets (3), to separate and mix the staple randomly. This opens up the packed fibres (1) within the hopper (2) and blends the fibre into an intertwined batt. When the mixing process is complete, the air jets (3) are turned off.

The fibres then pass from the hopper into apparatus (4) that cards the fibres, laying them out parallel with each other. Then the fibres are cross-lapped by suitable means such as, in general terms, via a measured swinging arm (5) that travels across the width of a conveyor belt (7) which laps (8) the fibre and allows it to settle into a loose fill on a conveyor belt. Other methods may be used to cross-lap the batt. Then the fibres are needle punched (9) using suitable equipment to entwine them before calendering by compressing and thermo bonding the fibre web preferably between heated rollers (10) to the desired thickness. A fibre panel is created (11), preferably about 9 mm (or 12 mm), thick, and a suitable size for the panel, such as about 2.4 meters wide.

Figure 2:
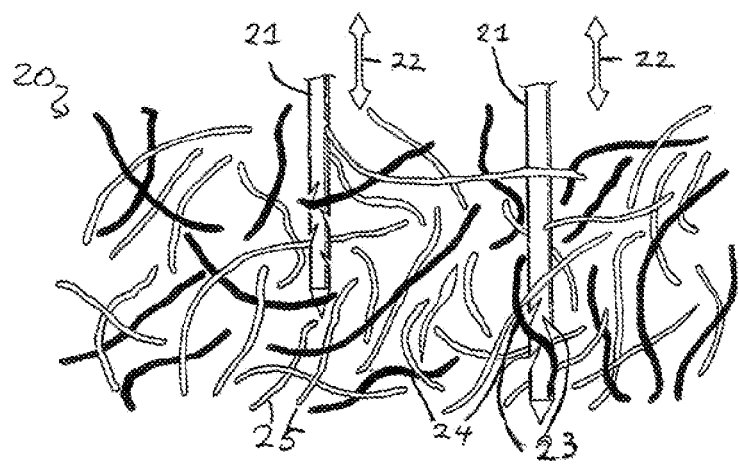
FIG. 2 shows the process of needle punching the fibres during the production process.

The web is needle punched in this process using a suitable needle punch apparatus (9) that reduces the height of the fibre web. Needle punching tangles the individual fibres together, forming a compact web of fibres. This is shown in FIG. 2, which shows a mass of fibres (20) where the barbed needles (21) catch and tangle individual fibres within the needle barbs (23) as the needles (21) continuously move up and down (22) through the fibre web (20). The fibre web (20) is shown as comprising two types of fibres in the Figure; such as black fibres (24) that may have a different melting point to the white fibres (25), as one example.

The resulting, now more compacted, fibre web is calendered and thermally bonded, in general terms, by being passed through heated rollers (10) in order to compress the web into a panel (11). The rollers (10) may have a gap between of the approximate thickness of the panel, and the web is compressed to form a relatively rigid panel material. One or both of the rollers (10) may be heated, preferably to a temperature just above the melting point of the fibre, or of the lower melting point component if a mixed melting point combination is used. For example if a mixture of 110 C and a 240 C melting point PET staple fibres is being used, one roller may be heated to about 115 C. The web is passed between the rollers at a speed suitable to heat the web uniformly, and to soften the fibre. This speed may be at a relatively low speed in order to provide a comparatively smooth surface to the product.

The resulting fibre panel material is cut into suitable lengths and allowed to cool while allowed to lay flat, to minimise any warping.

The panel may be of any suitable width, and a width of about 2.4 meters is ideal in most situations. The thickness of the panel may be selected according to the desired result. A thinner panel is more flexible and less rigid. A thickness of from 5 to 25 mm is preferred in most situations, more preferably from 6 to 15 mm or 6 to 12 mm, and a thickness of 9 mm or 12 mm is suitable in most instances, which provides a relatively rigid, and free standing panel.

The fibre panels are lightweight, and may have a density of around 2,400 grams per square meter of panel that is 12 mm thick. This is around a third of the weight of an equivalent panel of MDF board or of plasterboard.

The panels of the invention are also easily cut and shaped, using conventional tools. Suitable lengths may be produced, such as of 1.2 meters.

The panels produced by this process are ideally suited for use in partitioning and screens and workstation surrounds. The panel is pinable and the pinholes eventually tend to close up when the pin is removed over a period of time, or at least tend to appear less prominent. The panel is strong, and flexible.

Preferably, the resulting panel is sufficiently rigid to be free-standing when in use. Generally, a thicker panel will be more rigid, but the rigidity resulting will also depend on the length of the panel, short panels will be less liable to bend, whereas long lengths of panels will need to be made thicker, or be held within a framework.

The panels of the invention may be moulded to include ribs, or indented portions, to improve their appearance, and to enhance their strength, as ribs can add to the rigidity and strength. The panels may be moulded to include folds, bends, ribs, indents, dimples, corrugations, embossing, fluting, or the like, features. These features can be introduced into the panels of the present invention by any suitable means. Preferably, the panels may be created in the form of flat sheets, and later re-shaped to incorporate the fold bends or impressions. The panels may be shaped by the application of pressure, such as stamping the panels to deform them. Rolling the panels between ribbed rollers may create ribs or similar features. Simple manual bending and shaping may also be utilised. Care should be taken to prevent damage to the panels by applying too much force, or force too rapidly. Also the surface of the panels may be imprinted with patterns, by impressing an outline into the surface of the fibre panel material. Regular and symmetrical folds or indents that repeat are preferred for aesthetics, and to allow panels to be cut and joined easily and invisibly.

Normally, the shaping process will take place in conjunction with the application of additional heat in order to render the panels more malleable prior to the re-shaping process, and to lock in the new shape features upon cooling back to room temperature. The sheets of fibre panel may be moulded to re-shape them as part of the production process, or may separately and later be reheated for this purpose. The rollers mentioned in the production process above may be ridged or embossed to shape the resulting product.

Figure 3A:
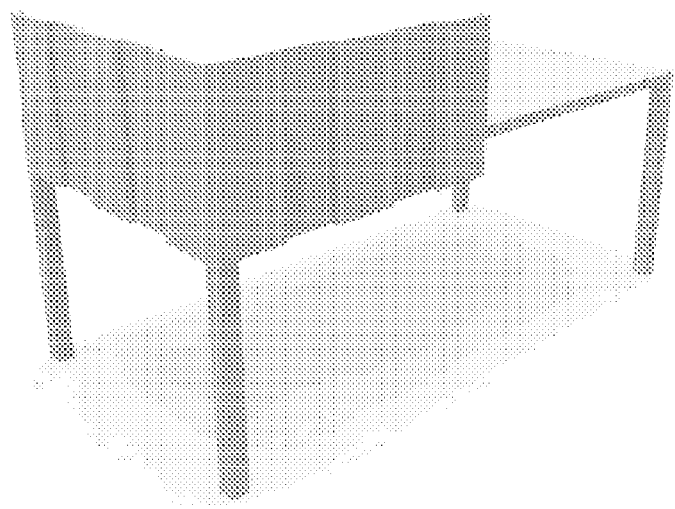
FIGS. 3A, 3B and 3C show examples of the fibre panels attached to a computer workstation.
Figure 3B:
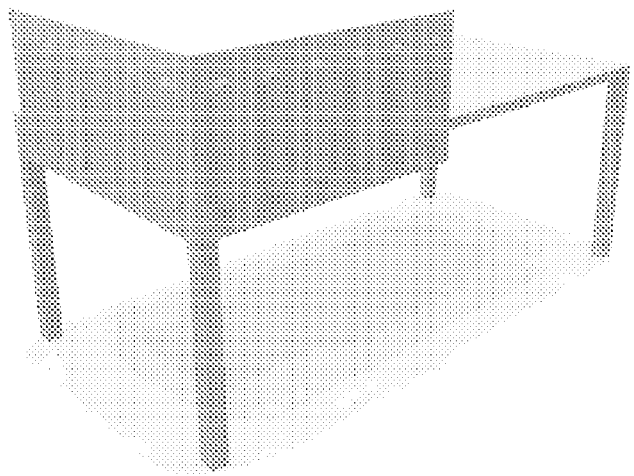
Figure 3C:
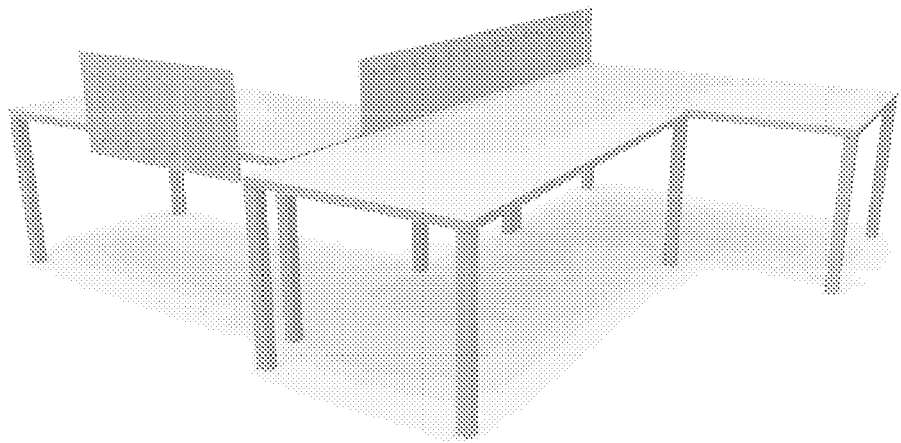
Figure 4:
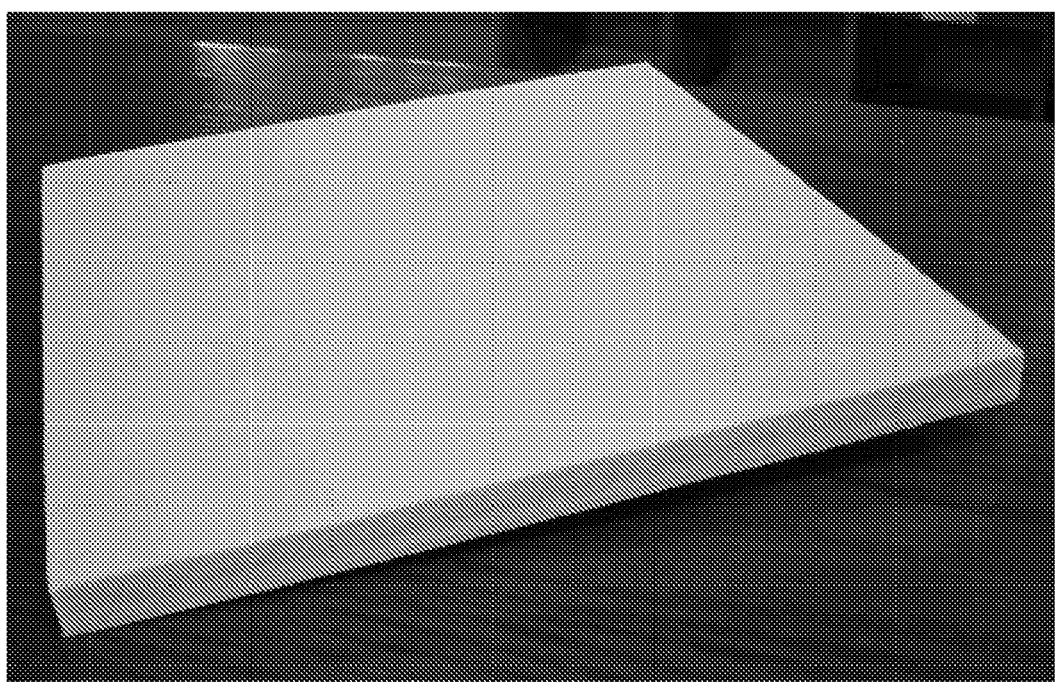
FIG. 4 shows a photograph of the finished panel.

Some examples of shaped fibre panels are shown in FIGS. 3A, 3B and 3C. FIG. 3A shows a workstation with a panel surround having a series of ribs extending along their face. FIGS. 3B and 3C show an alternative shaping, with regular indents within each panel.

The fibres may also be dyed a to have a specific colour in their production, before they are formed into a panel. This has an environmental advantage, because no dye will be required or toxic effluent produced during the panel manufacturing process. Additionally, in the production of the fibre panel, fibres previously dyed different colours can be mixed together to produce a panel that displays an intermediate colour from a distance, and has an interesting mixed colour up close. The shade of colour can be easily adjusted by altering to proportions of the two, or more, original colour fibres used in the initial mix. For example, mixing black and white fibres produces a panel that appears as grey, especially from a distance.

The panels may also be supported in frames, especially slotted into a simple U-shaped framework. Normally a single sheet of the fibre panel will be needed to provide sufficient acoustic properties, in contrast to the double sheet of MDF required in the traditional panels. The frame may aid in holding the panels in place, and to enhance their rigidity, and help protect their edges from casual damage, when bumped or touched. The framework may also aid in the panels appearance, by hiding the edges of the panels, allowing the panels to be roughly cut and finished, and consequently more easily installed.

The framework may also include a set of legs or support or connection means, in order to create wall dividers, or free standing screens. However, the panels of the present invention, may be folded in a zig-zag manner, which allows them to be free standing on a desk or within a room, without any additional supporting framework, or with only a minimal one. Thicker panels are preferred in this instance, especially for room dividers, which may be 1.5 meters high, which are intended to stand alone. Other arrangements, such as a series of troughs and ridges, or curved corrugations, or a series of corners may also be used, to provide the panels with a wider footprint, to allow them to stand upright on their own.

The fibre panels according to the invention have good acoustic properties, tested to the Australian Standard AS1935.1-1998 with a NRC (Noise Reduction Coefficient) value of 0.54, for example.

Additionally, the panels were found to have little if any off-gassing of volatile organic compounds, which is a problem with prior art panels due to the presence of glue and paint in those panels. In contrast little organic compound off-gassing occurred with the panels according to the present invention. Typically, for hydrocarbon off-gassing, the amount for the panel is less than $1000^{th}$ of the recommended level of permitted off-gassing. β-caprolactam off-gassing in the product is virtually nil. Both these measures indicate that VOC off-gassing is very low in the product of the present invention.

The fibre panels in accordance with the invention may preferably have a smooth surface, often with a shiny or polished appearance. This may be the result of passing the panels between heated rollers, especially at a relatively slow speed. But as a consequence, the surface appearance adds to the aesthetic appearance of the panels, especially in an office situation, where a clean, polished look is often thought to be very desirable.

Partitions, screens, acoustic panels, and wall panels utilising the panels of the present invention are simple to disassemble and separate into recycling streams, owing to the uncomplicated nature of the material. This means the present invention is particularly compatible with the recycling process. In contrast MDF board or plasterboard covered with adhesives, foam backing fabrics and fasteners are not particularly compatible with recycling processes. The panels, being of PET, may themselves be recycled into PET fibres. Possibly they can then be re-used to make more fibre panels according to the invention.

EXAMPLE 1

New PET

Two types of PET fibres were obtained from Wellman Inc, of 1133 Avenue of the Americas, New York N.Y. 10036, United States of America. One type is of a white colour with the physical attributes of 2 Denier thickness and 75 mm staple length and a melting point of 110 C, and the other type being black with the physical attributes of 6 denier and 75 mm staple length, and a melting point of 240 C.

A mixture was prepared comprising 40-45% by weight of the first type with 55-60% of the second type, in a hopper and blended, by blowing air into the hopper, and allowing the fibres to be blended together, to form a fluffy web of fibres.

The air mixing was stopped. The fluffy fibre web was passed from the hopper, through a carding apparatus, and cross-lapped using a moving arm, on to a conveyor belt to form a web approximately over 1 meter high and 2.4 meters wide. The conveyor belt then conveyed the fibre web through a needle punch, which compacted the web to a much lesser height.

The conveyor belt then brought the compacted web to the calendering rollers, with a gap of approximately 9 mm between, the top roller of which was heated to around 115 C. The web passed through the rollers, and was further compressed and heated in the passage through the rollers. The result was a grey coloured panel with the following characteristics: Colour—grey; Specific gravity—0.2; Melting point from 250 C, to 110 C; Ignition point—>400 C. Flammability was tested according to Standard AS/NZS 1530.3-1999 giving excellent results; nil ignition time, nil flame propagation time, Heat release integral of nil, smoke release of –2 log d, and optical density of 0.01 d/m. The test gave an Ignitability Index of 0, Spread of Flame Index of 0, Heat Evolved Index of 0, and Smoke Developed Index of 1.

A test of off-gassing of VOC (volatile organic compounds) was conducted. The results showed β-caprolactam=0; diethyl phthalate=3.66 microgram; aliphatic hydrocarbons=0.1 micrograms. The panels were placed over a glass filter funnel, and air drawn through at a constant prescribed flow rate. The air was passed into an adsorbent trap to collect volatile substances. After a set period the trap was removed and the contents analysed by gas chromatography. The volume of air sampled in the test was 60 liters, which equates to 61 microgram of esters, and 1.7 microgram of hydrocarbons per cubic meter of air space over the product. The Australian Worksafe time weighted average National Exposure Standard air level for nonane (typical hydrocarbon) is 1050 milligram of substance per cubic meter. The level of hydrocarbon found in the present invention fibre panel product is therefore less than $1000^{th}$ of this level. There is no standard for phthalate esters, but the levels discovered for these in the product are also low.

EXAMPLE 2

Recycled PET

The process of Example 1 was repeated, but with the a combination of two types of PET fibres which were obtained from the same source, but one type being of a recycled PET of an off-white colour with the physical attributes of 6 Denier 75 mm staple and a melting point of 240 C and the other type being white with the physical attributes as in Example 1 with a melting point of 110 C.

A panel was produced according to the process outlined in Example 1. The result was an off-white coloured panel with similar characteristics to those in Example 1.

It will be apparent that obvious variations or modifications may be made in accordance with the spirit of the invention that are intended to be part of the invention, and any such obvious variations or modification are therefore within the scope of the invention.

The invention claimed is:

1. A privacy panel of substantially rigid, non-woven fibre that has been carded, cross-lapped, needle punched, calendered and thermally-bonded, the panel comprising a single, substantially homogeneous, layer of a polyethylene terephthalate (PET) fibre wherein the panel has a substantially smooth surface and is sufficiently rigid to be free standing without requiring supporting framework and the PET fibre comprises a mixture of new PET fibre and recycled PET fibre.

2. The panel of claim 1 wherein one of said new PET fibre and said recycled PET fibre has a lower melting point than the other.

3. The panel of claim 2 wherein the one of said PET fibres has a melting point of about 110 C. and the other has a melting point of about 240 C.

4. The panel of claim 2 wherein the ratio of higher melting point PET to lower melting point PET is 5:95 to 95:5 as % w/w.

5. The panel of claim 3, wherein the ratio of higher melting point PET to lower melting point PET is approximately 60:40 as % w/w.

6. The panel of claim 1 characterised in that a substantial portion of said PET fibre is of recycled PET.

7. The panel of claim 6 wherein said panel has a ratio of recycled to new PET fibre in the range of 5:95 to 95:5% w/w.

8. The panel of claim 6 wherein said panel has a ratio of recycled to new PET fibre of about 40:60% w/w.

9. The panel of claim 8 wherein said panel has about 40% by weight of new PET fibres with a melting point of about 110 C. and about 60% by weight of recycled PET fibres with a melting point of about 240 C.

10. The panel of claim 1, which has a thickness in the range of from 6 mm to 15 mm.

11. The panel of claim 1, which has a thickness in the range of from 6 mm to 12 mm.

12. The panel of claim 1, which has a thickness of about 9 mm or of about 12 mm.

13. The panel of claim 1, which has colouring agents within the PET fibres.

14. The panel of claim 1, which has good acoustic properties.

15. The panel of claim 1 wherein the substantially smooth surface additionally includes a plurality of ribs or indentations.

16. The panel of claim 1, wherein the substantially homogeneous layer of polyethylene terephthalate (PET) fibre is recyclable.

17. The panel of claim 1 which is adapted to be used as a room divider.

18. A method of manufacturing a panel of substantially rigid, non-woven fibre that has been carded, cross-lapped, needle punched, calendared and thermally bonded, the panel comprising a single, substantially homogeneous, layer of polyethylene terephthalate (PET) fibre, wherein the PET fibre is comprised substantially of a mixture of new PET fibres and recycled PET fibres, one having a lower melting point than the other, wherein the panel has a substantially smooth surface and is sufficiently rigid to be free standing without requiring supporting framework, the method comprising the steps of:

thermally bonding and calendaring a panel by compressing the panel between first and second rollers, wherein at least one of the rollers is heated thereby imparting an increase in temperature to the panel sufficient to soften or melt one of the PET fibres having a lower melting point.

19. The method of claim 18 wherein said panel has a ratio of recycled to new PET fibre in the range of 5:95 to 95:5% w/w.

20. The method of claim 18 wherein said panel has a ratio of recycled to new PET fibre of about 40:60% w/w.

21. The method of claim 20 wherein said panel has about 40% by weight of new PET fibres with a melting point of about 110 C. and about 60% by weight of recycled PET fibres with a melting point of about 240 C.

* * * * *